(12) United States Patent
Tetsuka

(10) Patent No.: US 11,757,537 B2
(45) Date of Patent: Sep. 12, 2023

(54) POWER OVER FIBER SYSTEM

(71) Applicant: KYOCERA CORPORATION, Kyoto (JP)

(72) Inventor: Nobuyuki Tetsuka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 3 days.

(21) Appl. No.: 17/627,115

(22) PCT Filed: Jul. 22, 2020

(86) PCT No.: PCT/JP2020/028471
§ 371 (c)(1),
(2) Date: Jan. 13, 2022

(87) PCT Pub. No.: WO2021/024809
PCT Pub. Date: Feb. 11, 2021

(65) Prior Publication Data
US 2022/0255633 A1 Aug. 11, 2022

(30) Foreign Application Priority Data

Aug. 6, 2019 (JP) .................................. 2019-144349
Aug. 6, 2019 (JP) .................................. 2019-144350

(51) Int. Cl.
*H04B 10/80* (2013.01)
*H02J 50/30* (2016.01)
*G02B 6/42* (2006.01)
(52) U.S. Cl.
CPC ......... *H04B 10/807* (2013.01); *G02B 6/4296* (2013.01); *H02J 50/30* (2016.02)

(58) Field of Classification Search
None
See application file for complete search history.

(56) References Cited

U.S. PATENT DOCUMENTS 7,859,993 B1 * 12/2010 Choudhury ............. H04L 45/28
370/231
2005/0213894 A1 * 9/2005 Su ........................ G02B 6/4201
385/88
(Continued)

FOREIGN PATENT DOCUMENTS

JP         200116240 A    1/2001
JP         2010135989 A   6/2010
(Continued)

*Primary Examiner* — David W Lambert
(74) *Attorney, Agent, or Firm* — HAUPTMAN HAM, LLP

(57) ABSTRACT

A power over fiber system includes a power sourcing equipment, a powered device, optical fiber cables, optical switches, a detector and a control device. The power sourcing equipment includes a semiconductor laser that oscillates with electric power, thereby outputting feed light. The powered device includes a photoelectric conversion element that converts the feed light into electric power. The optical fiber cables transmit the feed light. The optical switches selectively connect the optical fiber cables. The optical fiber cables and the optical switches can form at least two transmission routes of the feed light. The detector detects a poor transmission point on a transmission route among the transmission routes of the feed light. The control device controls the optical switches so as to form another transmission route among the transmission routes of the feed light in accordance with the poor transmission point, the transmission route bypassing the poor transmission point.

11 Claims, 10 Drawing Sheets

(56) References Cited

U.S. PATENT DOCUMENTS

| | | | | |
|---|---|---|---|---|
| 2005/0226625 | A1* | 10/2005 | Wake | H04B 10/25753 |
| | | | | 398/115 |
| 2006/0169914 | A1* | 8/2006 | Holle | H01J 49/164 |
| | | | | 250/423 P |
| 2011/0255860 | A1* | 10/2011 | Lee | G01M 11/3136 |
| | | | | 398/10 |

FOREIGN PATENT DOCUMENTS

| | | | | |
|---|---|---|---|---|
| JP | 201785355 | A | | 5/2017 |
| JP | 2018136464 | A | * | 8/2018 |
| JP | 2018136464 | A | | 8/2018 |

* cited by examiner

POWER OVER FIBER SYSTEM

RELATED APPLICATIONS

The present application is a National Phase of International Application No. PCT/JP2020/028471 filed Jul. 22, 2020, which claims priority to Japanese Application No. 2019-144349, filed Aug. 6, 2019 and Japanese Application No. 2019-144350, filed Aug. 6, 2019.

TECHNICAL FIELD

The present disclosure relates to a power over fiber system.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In optical power supply, further improvement of optical power supply efficiency is required. As one way therefor, improvement of photoelectric conversion efficiency at the power supplying side and the power receiving side is required.

Solution to Problem

A power over fiber system of an aspect of the present disclosure includes:
a power sourcing equipment including a semiconductor laser that oscillates with electric power, thereby outputting feed light;
a powered device including a photoelectric conversion element that converts the feed light into electric power;
a plurality of optical fiber cables that transmit the feed light; and
a plurality of optical switches that selectively connect the optical fiber cables,
wherein the optical fiber cables and the optical switches can form at least two transmission routes of the feed light, and
wherein the power over fiber system further comprises:
a detector that detects a poor transmission point on a transmission route among the at least two transmission routes of the feed light; and
a control device that controls the optical switches so as to form another transmission route among the at least two transmission routes of the feed light in accordance with the poor transmission point detected by the detector, the another transmission route bypassing the poor transmission point.

DESCRIPTION OF EMBODIMENTS

Hereinafter, embodiments of the present disclosure will be described with reference to the drawings.

(1) Outline of System

First Embodiment

Figure 1:
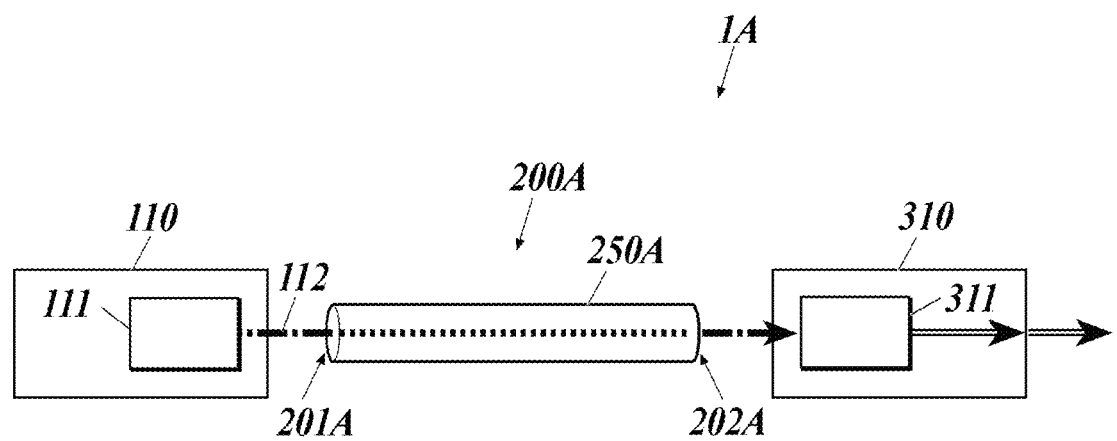
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
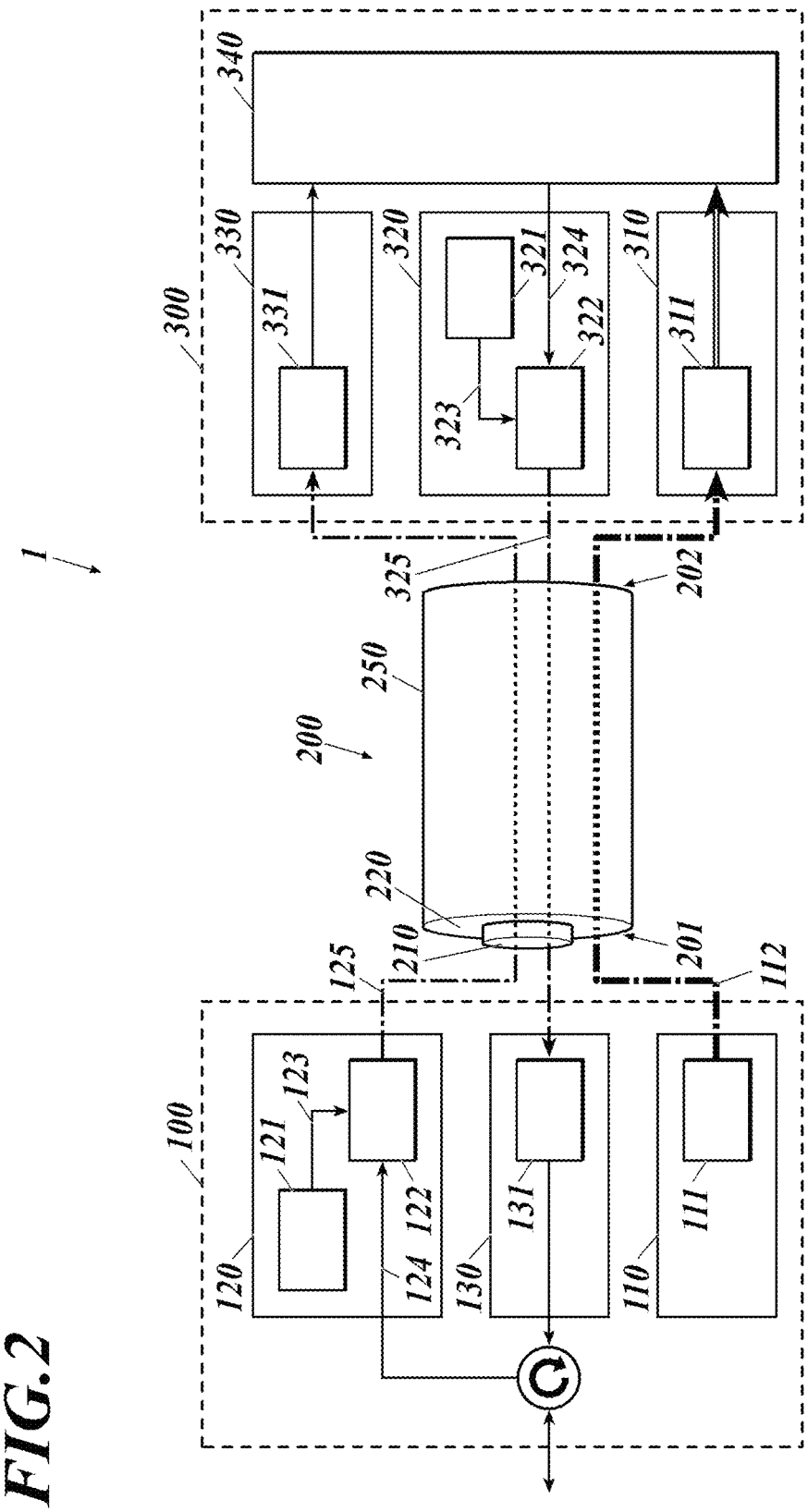
FIG. 2 is a block diagram of a power over fiber system according to a second embodiment of the present disclosure.

As shown in FIG. 2, a power over fiber (PoF) system 1 of this embodiment includes an optical power supply system through an optical fiber and an optical communication system therethrough, and includes: a first data communication device 100 including a power sourcing equipment (PSE) 110; an optical fiber cable 200; and a second data communication device 300 including a powered device (PD) 310.

In the following description, as a general rule, components donated by the same reference signs as those of already-described components are the same as the already-described components unless otherwise stated.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
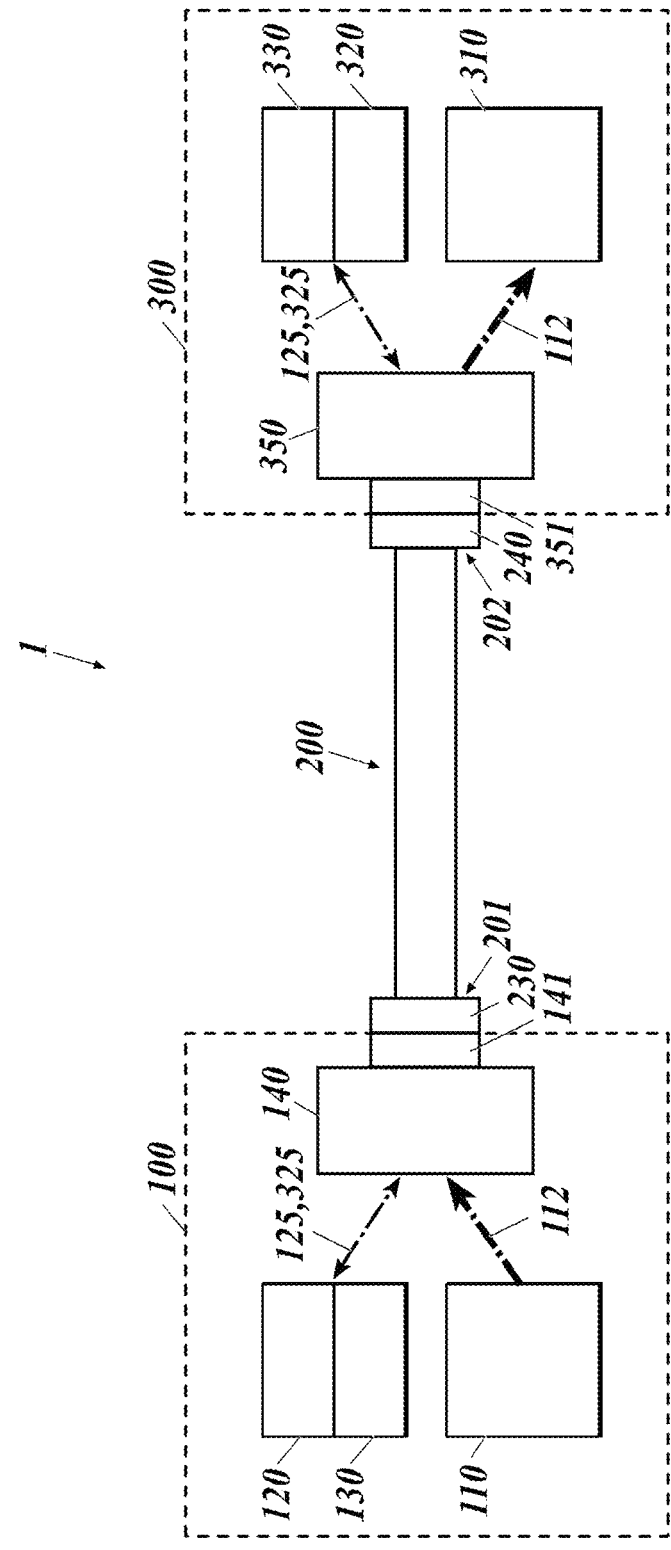
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
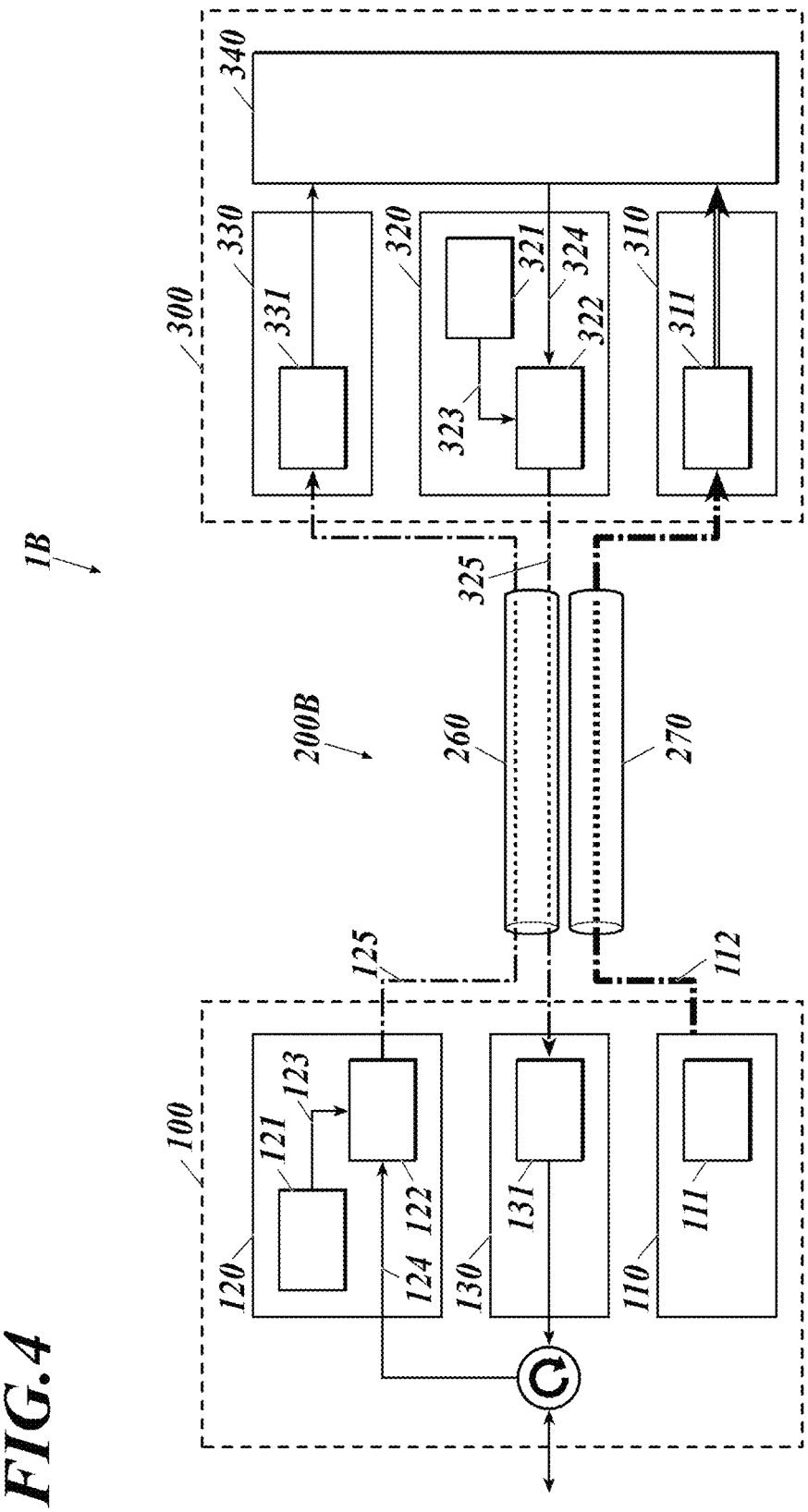
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Configuration to Detect Poor Transmission

[First Configuration Example Having Detection Function of Poor Transmission]

Next, a configuration to detect poor transmission of feed light will be described with reference to the drawings.

Figure 5:
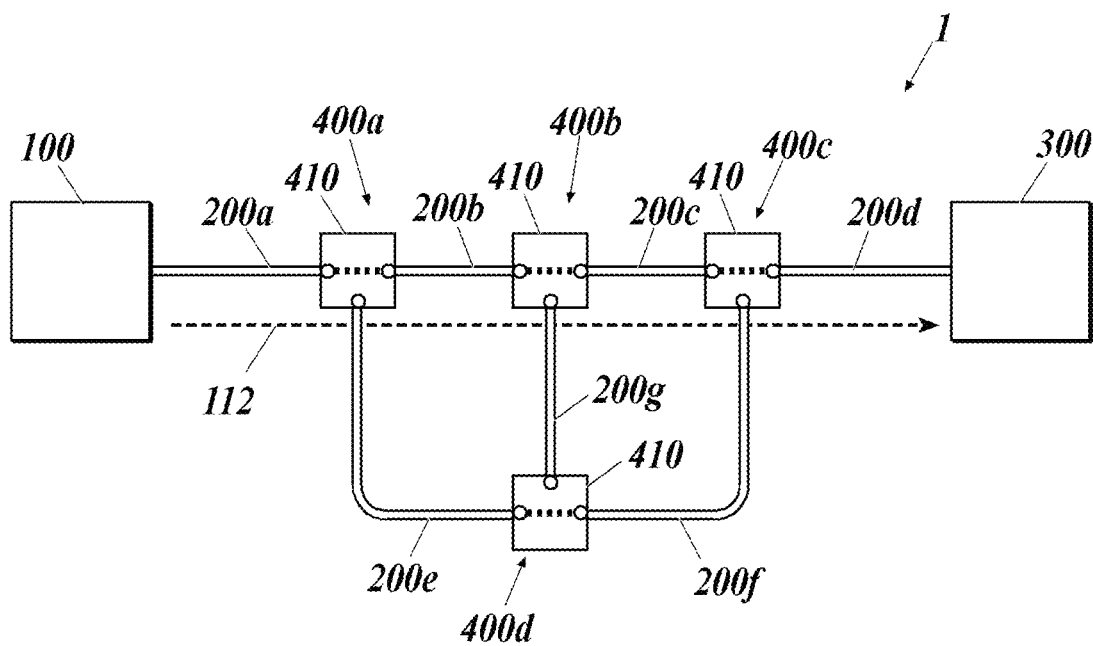
FIG. 5 is a block diagram of a first configuration example having a function to detect poor transmission of feed light, of the power over fiber system according to the second embodiment of the present disclosure.
Figure 6:
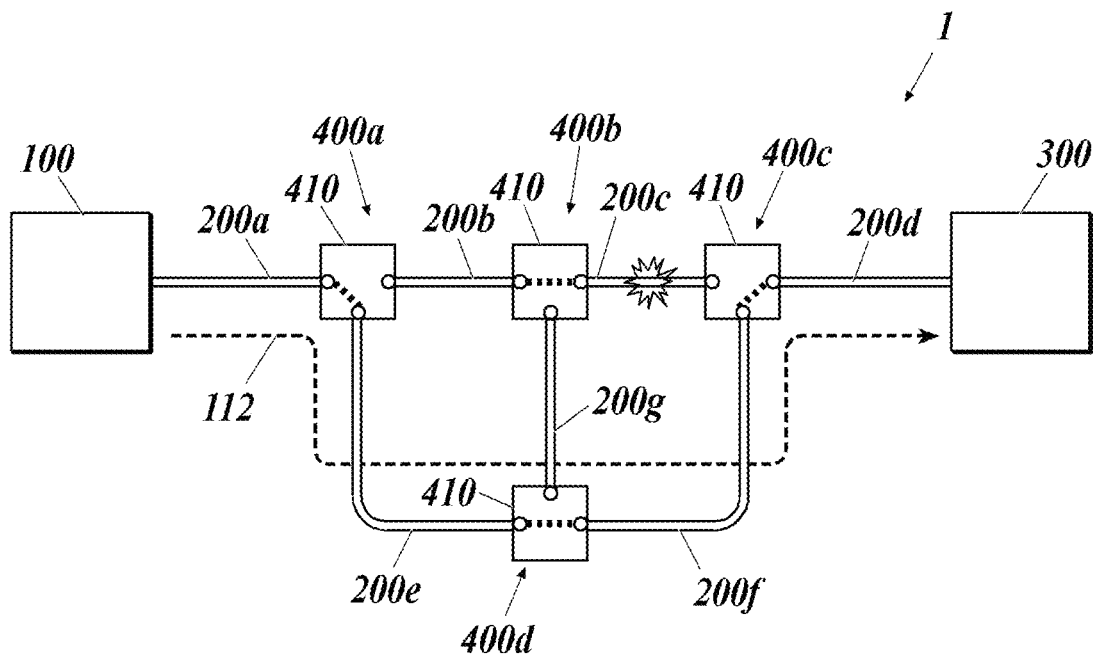
FIG. 6 is a block diagram showing a state in which the poor transmission is occurring in the first configuration example shown in FIG. 5.

FIG. 5 shows a first configuration example having a function to detect poor transmission of feed light, of the above-described power over fiber system 1. FIG. 6 shows a state in which the poor transmission is occurring in the first configuration example.

In the following description, as a general rule, components donated by the same reference signs as those of already-described components are the same as the already-described components unless otherwise stated.

In the power over fiber system 1 of the first configuration example having the detection function of the poor transmission, transmission routes of the feed light 112 are formed by optical fiber cables 200a to 200g, and the optical fiber cables 200a to 200g are selectively connected by connecting devices 400a to 400d each including an optical switch 410 for power supply.

The optical fiber cables 200a to 200g are the same in configuration although different in position. Hence, where it is unnecessary to explain these distinctively, they are simply referred to as "optical fiber cable(s) 200" (shown in FIG. 8).

Similarly, the connecting devices 400a to 400d are the same in configuration although different in position. Hence, where it is unnecessary to explain these distinctively, they are simply referred to as "connecting device(s) 400" (shown in FIG. 8).

In the first configuration example having the detection function of the poor transmission, between the first data communication device 100 and the second data communication device 300, at least two transmission routes that can connect the first data communication device 100 and the second data communication device 300 are provided. In the first configuration example, seven optical fiber cables 200a to 200g are connected by four connecting devices 400a to 400d. However, the number of optical fiber cables 200 and the number of connecting devices 400 may be increased or decreased.

Between the first data communication device 100 and the second data communication device 300, four optical fiber cables 200a, 200b, 200c, 200d are arranged so as to be connected in series via three connecting devices 400a, 400b, 400c.

Each optical switch 410 has three ports to each of which an end of the cladding 220 of an optical fiber cable 200 is connected, and two of the three ports can be selected and connected to transmit light.

The optical switches 410 of the connecting devices 400a, 400b, 400c connect the four optical fiber cables 200a to 200d in series by each using two ports. To the other ports of the optical switches 410 of the connecting devices 400a, 400b, 400c, ends of the other optical fiber cables 200e, 200f, 200g are connected, respectively. The other ends of these three optical fiber cables 200e to 200g are connected to the three ports of the optical switch 41 of the connecting device 400d individually.

Constructing such a connection structure between the first data communication device 100 and the second data communication device 300 makes it possible to select and form any of a first transmission route composed of the optical fiber cables 200a, 200b, 200c, 200d, a second transmission route composed of the optical fiber cables 200a, 200e, 200g, 200c, 200d, a third transmission route composed of the optical fiber cables 200a, 200b, 200g, 200f, 200d, and a fourth transmission route composed of the optical fiber cables 200a, 200e, 200f, 200d, in order to transmit the feed light 112 from the first data communication device 100 to the second data communication device 300.

Hence, in the power over fiber system 1 of the first configuration example having the detection function of the poor transmission, for example, as shown in FIG. 6, if the poor transmission occurs at one (optical fiber cable 200c in the case shown in FIG. 6) of the optical fiber cables 200, the feed light 112 can be transmitted by using another transmission route (fourth transmission route in the case shown in FIG. 6) for avoiding the poor transmission.

Figure 7:
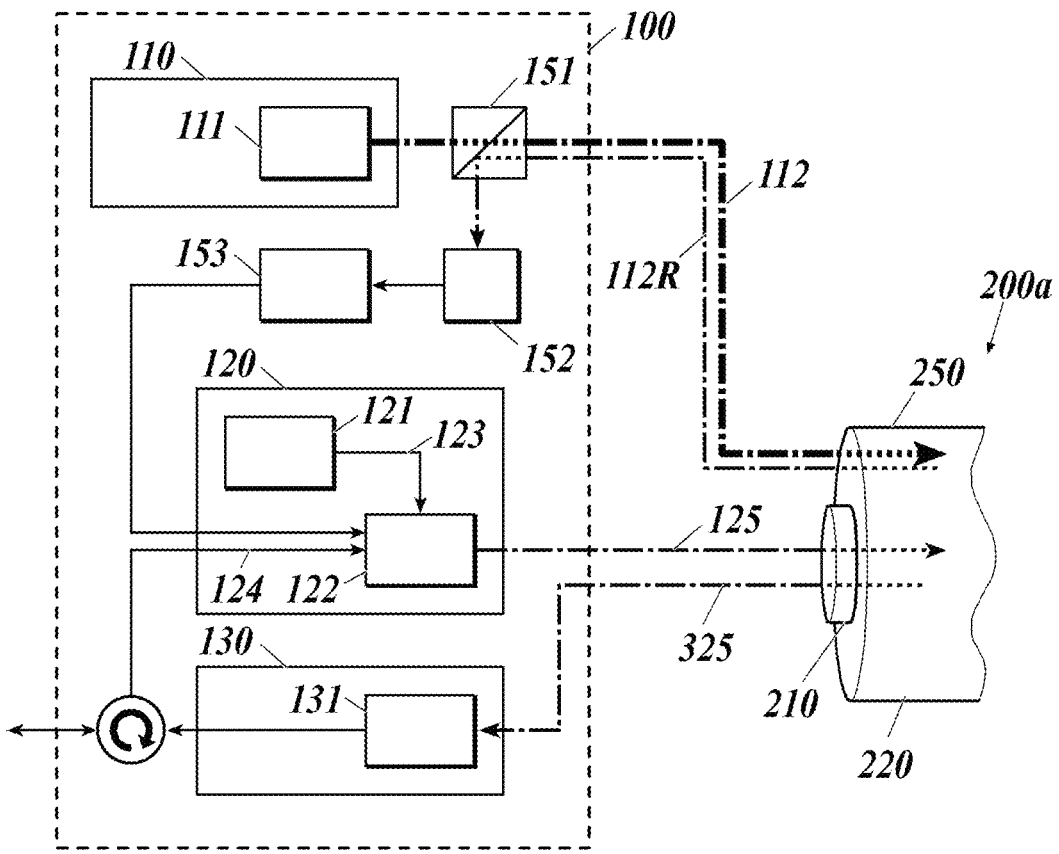
FIG. 7 is a block diagram of a first data communication device in the first configuration example shown in FIG. 5.

The first data communication device 100 of the power over fiber system 1 of the first configuration example having the detection function of the poor transmission further includes, as shown in FIG. 7, components to detect reflected light 112R of the feed light 112 and output instructions to the optical switches 410 to form a transmission route that bypasses a poor transmission point.

That is, the first data communication device 100 includes: a beam splitter 151 that extracts the reflected light 112R of the feed light 112 reflected at a poor transmission point, from an end of the cladding 220 of the optical fiber cable 200a, the end on which the feed light 112 from the semiconductor laser 111 is incident; a photoelectric conversion element 152 that receives the reflected light 112R extracted by the beam splitter 151; and a control device 153 that outputs instructions to switch port connection states (in which two of the three ports are connected) of the optical switches 410 of the connecting devices 400a to 400d on the basis of detection by the photoelectric conversion element 152.

The beam splitter 151 is arranged between the semiconductor laser 111 and the optical fiber cable 200a, allows the feed light 112 that travels from the semiconductor laser 111 toward the optical fiber cable 200a to pass through, and reflects, toward the photoelectric conversion element 152, the reflected light 112R that travels from the optical fiber cable 200a toward the semiconductor laser 111, the reflected light 112R being from the poor transmission point.

The photoelectric conversion element 152 is arranged so as to face a direction in which the beam splitter 151 reflects the reflected light 112R, and detects the light intensity of the incident reflected light 112R.

The beam splitter 151 and the photoelectric conversion element 152 constitute a detector that detects the reflected light 112R of the feed light 112, the reflected light 112R being from the poor transmission point on a transmission route of the feed light 112.

The control device 153 performs a process of detecting, on the basis of the detection signal of the photoelectric conversion element 152, occurrence of the poor transmission and the distance to the poor transmission point, at which the poor transmission is occurring, and a process of identifying, on the basis of the detected distance to the poor transmission point, a transmission route that bypasses the poor transmission point, and outputting instructions to switch connections in the optical switches 410 to transmit the feed light 112 along the identified transmission route.

The control device 153 may be configured by a microcomputer or a sequencer using an analog circuit or a digital circuit.

If the feed light 112 is properly received by the photoelectric conversion element 311 of the second data communication device 300, the light intensity of the reflected light 112R is low, whereas if the poor transmission occurs in the middle of a transmission route, the light intensity of the reflected light 112R is high because the feed light 112 is reflected at the poor transmission point.

The control device 153 includes a not-shown memory that stores a threshold value for the light intensity detected by the photoelectric conversion element 152, and detects occurrence of the poor transmission when determining that the detected light intensity exceeds the stored threshold value.

The control device 153 can calculate the distance from the first data communication device 100 to the poor transmission point from the elapsed time from exit of the feed light 112 to incidence of the reflected light 112R, the elapsed time being based on the output of the photoelectric conversion element 152. Alternatively, the control device 153 may be configured to calculate the distance from the first data communication device 100 to the poor transmission point from a phase difference between the feed light 112 and the reflected light 112R, the phase difference being based on the output of the photoelectric conversion element 152.

As described above, in the power over fiber system 1 of the first configuration example having the detection function of the poor transmission, the first to fourth transmission routes can be selectively formed, and the control device 153 outputs instructions to instruct the optical switches 410 of the connecting devices 400a to 400d about their respective predetermined port connection states for forming a transmission route selected from among the first to fourth transmission routes.

The control device 153 selects a shorter transmission route. For example, when the poor transmission is not occurring, the control device 153 outputs the port-connection-state instructions to simply form a transmission route having the shortest transmission distance (e.g., the first transmission route), whereas when the poor transmission is occurring, the control device 153 outputs the port-connection-state instructions to form a transmission route having the shortest transmission distance (e.g., the fourth transmission route) among the transmission route(s) that bypass(es) the poor transmission point. For that, the control device 153 stores transmission distances of the first to fourth transmission routes. A priority order of the first to fourth transmission routes may be determined in advance.

The control device 153 always stores which one of the first to fourth transmission routes is currently formed, and hence when obtaining the distance from the first data communication device 100 to the poor transmission point, can determine where on which transmission route, the poor transmission is occurring, namely, can identify in which one of the optical fiber cables 200a to 200g, the poor transmission is occurring.

The control device 153 selects, from among the first to fourth transmission routes, a transmission route not including the optical fiber cable 200 where the poor transmission is occurring. Then, the control device 153 instructs the optical switches 410 of the connecting devices 400a to 400d individually about their proper port connection states to form the selected transmission route.

The port-connection-state instructions for the optical switches 410 of the connecting devices 400a to 400d may be transmitted thereto by connecting communication cables to the optical switches 410, the communication cables being capable of transmitting electric signals.

However, in this example, the port-connection-state instructions for the optical switches 410 of the connecting devices 400a to 400d are transmitted thereto by being contained in the signal light 125, which is output from the transmitter 120, and propagating through the cores 210 of the optical fiber cables 200.

The control device 153 controls the modulator 122 of the transmitter 120 to modulate the laser light 123, which is from the semiconductor laser 121, on the basis of the port-connection-state instructions for the optical switches 410, and output the modulated laser light 123 as the signal light 125.

At the time, the modulator 122 modulates the laser light 123 such that the modulated laser light 123 (signal light 125) contains (pieces of) destination information indicating which instruction is for which connecting device, 400a, 400b, 400c or 400d, and (pieces of) control information indicating the port connection states, and then outputs the signal light 125. This allows the second data communication device 300 and the connecting devices 400 to distinguish transmission information for the second data communication device 300 or another node and the instructions for the optical switches 410, and enables proper communication to the second data communication device 300 and the connecting devices 400.

Figure 8:
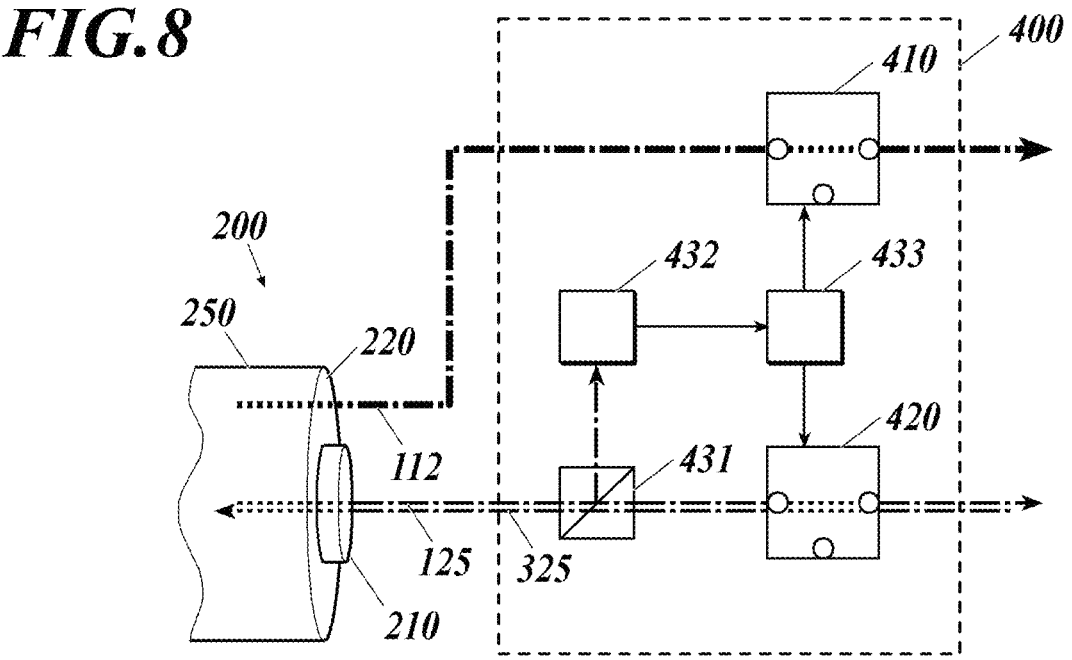
FIG. 8 is a block diagram of a connecting device in the first configuration example shown in FIG. 5.

FIG. 8 is a block diagram showing configuration of each connecting device 400.

Each connecting device 400 includes the above-described optical switch 410 for power supply that switches the optical route of the feed light 112, an optical switch 420 for signals that switches the optical route of the signal light 125/325, a beam splitter 431 that extracts a portion of the signal light 125, which is from an end of an optical fiber cable 200, a photodiode 432 for signals that receives the portion of the signal light 125 extracted by the beam splitter 431, and a control device 433 that performs control to switch the port connection state (in which two of the three ports are connected) of each of the optical switches 410, 420 on the basis of detection by the photodiode 432.

The beam splitter 431 is arranged so as to allow the signal light 125/325 that has propagated/is going to propagate through the core of the optical fiber cable 200 to pass through. The beam splitter 431 allows the signal light 325 that is going to travel therefrom toward the optical fiber cable 200 to pass through, and reflects, toward the photodiode, a portion of the signal light 125 that has traveled thereto from the optical fiber cable 200, and allows the other portion to pass through. The reflectance of the beam splitter 431 is equal to or greater than the minimum value that enables the photodiode 432 to read the information contained in the signal light 125 reflected by the beam splitter 431.

The photodiode 432 is arranged so as to face a direction in which the beam splitter 431 reflects the signal light 125, and demodulates the incident signal light 125 to an electric signal and outputs the electric signal.

If the electric signal output from the photodiode 432 contains the above-described destination information and control information, the control device 433 reads these. Then, the control device 433 determines whether the destination indicated by the destination information is its connecting device 400 or another connecting device 400. If the control device 433 determines that the destination is its connecting device 400, the control device 433 causes each of the optical switches 410, 420 to perform the switching so as to be the port connection state included in the control information.

If the control device 433 determines that the electric signal output from the photodiode 432 does not contain the destination information and the control information, or determines that the destination indicated by the destination information is another connecting device 400, the control device 433 lets each of the optical switches 410, 420 keep the current port connection state.

The control device 433 may be configured by a microcomputer or a sequencer using an analog circuit or a digital circuit.

Similarly to the optical switch 410, the optical switch 420 has three ports to each of which an end of the core 220 of an optical fiber cable 200 is connected, and two of the three ports can be selected and connected to transmit light.

The optical switches 410, 420 are controlled by the control device 433 to connect the same optical fiber cables 200.

Each connecting device 400 may further include a photoelectric conversion element that receives a portion of the feed light 112 to be further configured to supply electric power to the components of the connecting device 400. This can eliminate the need to provide each connecting device 400 with a power source.

Figure 9:
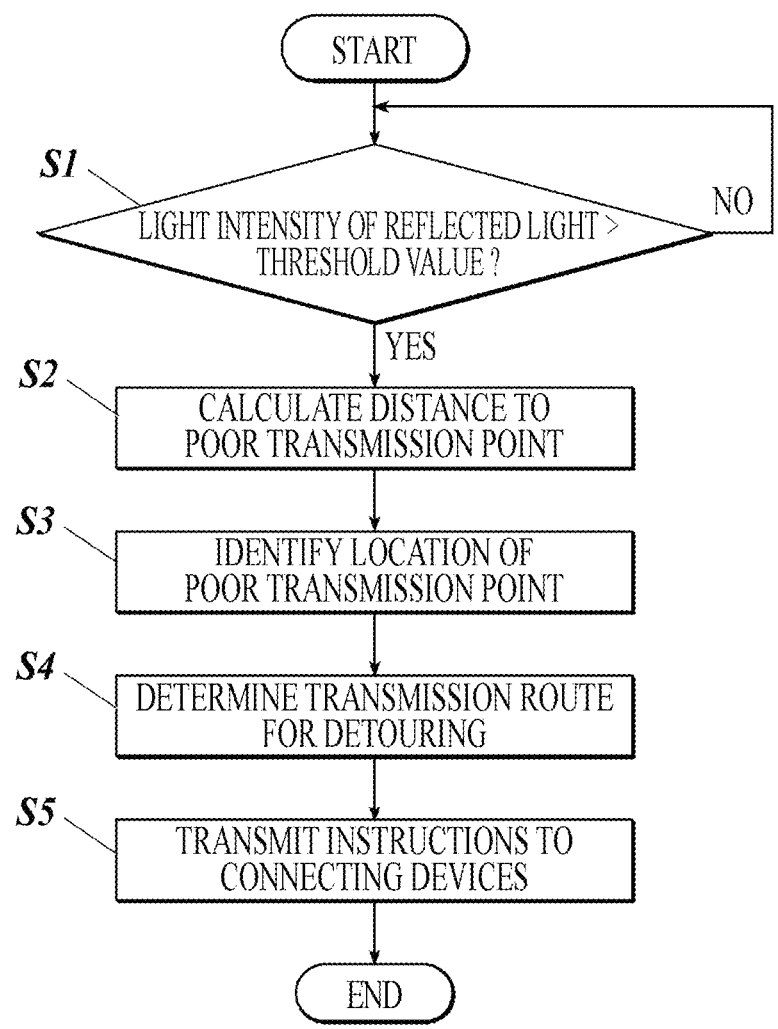
FIG. 9 is a flowchart of a process that is performed by a control device of the first data communication device.

FIG. 9 is a flowchart of a process that is performed by the control device 153 of the first data communication device 100 in detecting the poor transmission of the feed light 112.

As shown in FIG. 9, during power supply, the control device 153 compares the detected light intensity of the reflected light 112R of the feed light 112 received by the photoelectric conversion element 152 with a pre-stored threshold value (Step S1). If the detected light intensity of the reflected light 112R does not exceed the threshold value, the control device 153 repeats the comparison with the threshold value.

If the detected light intensity of the reflected light 112R exceeds the threshold value, the control device 153 determines that the poor transmission is occurring, and calculates the distance from the first data communication device 100 to the poor transmission point from the output of the photoelectric conversion element 152 (Step S2).

Since the control device 153 has stored the instructions to switch the port connection states last output to the optical switches 410 of the connecting devices 400, the control device 153 can identify which one of the first to fourth transmission routes is the current transmission route. The control device 153 identifies, on the basis of the distance from the first data communication device 100 to the poor transmission point calculated in Step S2, where (which optical fiber cable 200) on the current transmission route, the poor transmission is occurring (Step S3).

The control device 153 selects and determines, from the first to fourth transmission routes, a transmission route capable of bypassing the identified poor transmission point (Step S4).

Then, the control device 153 transmits, to the optical switches 410 of the connecting devices 400a to 400d, the signal light 125 of the transmitter 120 with the port-connection-state instructions (i.e., destination information and control information) contained, to form the selected transmission route (Step S5), and ends the process.

The process of Steps S1 to S5 is repeated at short intervals.

The connecting devices 400a to 400d receive the signal light 125 and demodulate the signal light 125 to electric signals at their photodiodes 432, and read the destination information and the control information contained therein.

Then, the connecting devices 400a to 400d perform control to switch the port connection states of their optical switches 410 as appropriate to form the transmission route capable of bypassing the poor transmission point.

Thus, the power over fiber system 1 of the first configuration example having the detection function of the poor transmission is configured to obtain, from the reflected light 112R of the feed light 112, the distance to the poor transmission point, and control the optical switches 410 of the connecting devices 400 so as to form another transmission route of the feed light 112, the transmission route bypassing the poor transmission point.

Hence, even if the poor transmission occurs on a transmission route of the feed light, the feed light 112 can be transmitted along another transmission route that bypasses the poor transmission point.

Therefore, even if a situation occurs in which the feed light 112 cannot be transmitted due to the poor transmission point, a quick recovery can be made, and electric power can be supplied with a higher efficiency.

Further, the above-described power over fiber system 1 is configured to control, by the signal light 125, the optical switches 410 of the connecting devices 400 through the optical fiber cables 200, thereby being able to control the optical switches 410 by using the communication function that the power over fiber system 1 has. This makes it possible to avoid complicating the system and construct the system with a few resources.

Further, the above-described power over fiber system 1 is configured such that the control device 153 controls the optical switches 410 so as to preferentially form, as the transmission route of the feed light, a transmission route having a shorter transmission distance. This can minimize transmission loss of the feed light 112.

[Second Configuration Example Having Detection Function of Poor Transmission]

Next, a second configuration example to detect the poor transmission of the feed light will be described with reference to the drawings.

In the second configuration example, as in the first configuration example, between the first data communication device 100 and the second data communication device 300, seven optical fiber cables 200a to 200g are connected by four connecting devices 400a to 400d (shown in FIG. 5 and FIG. 6). However, the number of optical fiber cables 200 and the number of connecting devices 400 may be increased or decreased.

In the second configuration example, instead of the above-described connecting devices 400, connecting devices 400A detect the poor transmission of the feed light.

The first data communication device 100 and the second data communication device 300 are the same as those shown in FIG. 2 in configuration.

Figure 10:
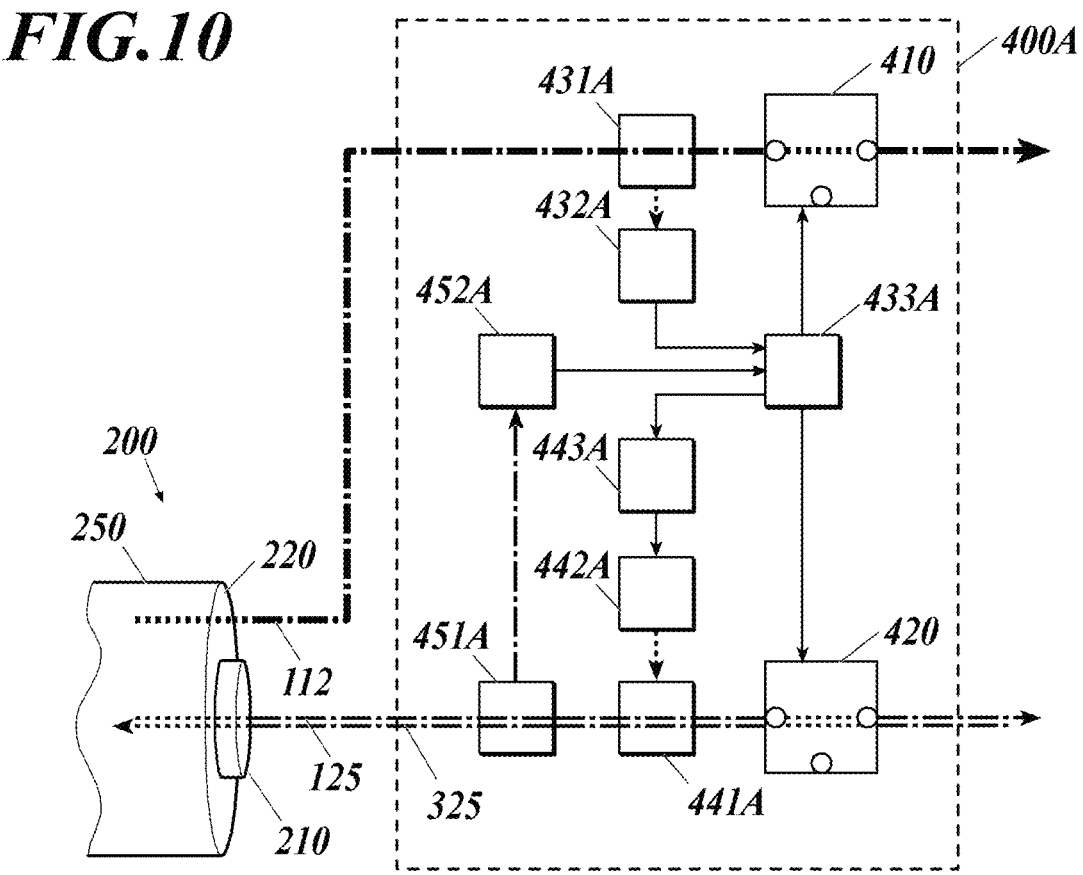
FIG. 10 is a block diagram of a connecting device in a second configuration example having the function to detect poor transmission of feed light.

FIG. 10 is a block diagram showing configuration of each connecting device 400A.

Each connecting device 400A includes the above-described optical switch 410 for power supply that switches the optical route of the feed light 112, an optical switch 420 for signals that switches the optical route of the signal light 125/325 and other signal light, which is described below, a control device 433A that performs control to switch in each of the optical switches 410, 420, a beam splitter 451A that extracts a portion of each of the signal light 125/325, which is from/to an end of an optical fiber cable 200, and the other signal light (which hereinafter may be collectively referred to as "signal light or the like"), and a photodiode 452A for signals that receives the portion of the signal light or the like extracted by the beam splitter 451A.

Each connecting device 400A further includes a beam splitter 431A that extracts a portion of the feed light 112, which is from the end of the optical fiber cable 200, a photoelectric conversion element 432A that receives the portion of the feed light 112 extracted by the beam splitter 431A, a semiconductor laser 443A for signals, a modulator 442A that modulates laser light under the control of the control device 433A, and a beam splitter 441A that outputs the modulated laser light as the other signal light onto the same transmission route as that of the signal light 125/325.

The beam splitter 431A and the photoelectric conversion element 432A constitute a detector that detects a poor transmission state of the feed light 112.

The beam splitter 431A extracts a portion of the feed light 112 in the middle of a transmission route, and inputs the portion of the feed light 112 to the photoelectric conversion element 432A. The photoelectric conversion element 432A detects the light intensity of the input portion of the feed light 112, and inputs the detected light intensity to the control device 433A.

The photoelectric conversion element 432A may be further configured to supply electric power to the components of the connecting device 400A by the feed light 112 incident thereon. This can eliminate the need to provide each connecting device 400A with a power source.

The beam splitter 451A extracts a portion of each of the signal light or the like traveling toward the first data communication device 100 and the signal light or the like traveling toward the second data communication device 300, and inputs the portion to the photodiode 452A. The photodiode 452A demodulates the signal light or the like input from the beam splitter 451A to an electric signal, and inputs the electric signal to the control device 433A.

The semiconductor laser 443A outputs laser light, and the modulator 442A controlled by the control device 433A modulates the laser light to the other signal light, and inputs the other signal light to the beam splitter 441A.

The beam splitter 441A sends out the other signal light, on the same transmission route as that of the signal light 125/325, toward each of the first data communication device 100 and the second data communication device 300.

The semiconductor laser 443A, the modulator 442A and the beam splitter 441A constitute an output unit that outputs the detection result of the detector to outside.

The control device 433A performs a first process of determining from the light intensity of the feed light 112 whether the poor transmission state of the feed light 112 is occurring, and outputting the determination result to the outside, a second process of outputting, to the outside, the port-connection-state instructions for the optical switches 410 of the connecting devices 400A for forming a transmission route that bypasses the poor transmission point based on the determination results of the connecting devices 400A about whether the poor transmission state is occurring, and a third process of performing control to switch port connection in each of the optical switches 410, 420 in accordance with the port-connection-state instruction(s).

The control device 433A may be configured by a microcomputer or a sequencer using an analog circuit or a digital circuit.

For the first process, the control device 433A determines from the light intensity of the feed light 112 detected by the photoelectric conversion element 432A whether the poor transmission state of the feed light 112 is occurring on the upstream side (first data communication device 100 side) of its connecting device 400A. That is, if the poor transmission state occurs on the upstream side of the connecting device 400A, the detected light intensity of the feed light 112 decreases (is low). The control device 433A includes a memory that stores a predetermined threshold value, and compares the detected light intensity of the feed light 112 with the threshold value, thereby determining whether the poor transmission state is occurring.

Further, the control device 433A, through the semiconductor laser 443A and the modulator 442A, makes the other signal light to thereby output the determination result to the outside (other connecting devices 400A, first data communication device 100, second data communication device 300).

At the time, the control device 433A puts, in the other signal light, the determination result information and source information indicating which connecting device 400A has made the determination, and outputs the other signal light to the outside. This allows the other connecting devices 400A, the first data communication device 100 and the second data communication device 300 that have received the other signal light to recognize whether an area on the upstream side of a specific connecting device 400A is in the normal state or the poor transmission state.

For the second process, the control device 433A obtains the determination result information of each of the connecting devices 400A excluding its connecting device 400A, from the other signal light from each of the other connecting devices 400A.

That is, the control device 433A receives, through the photodiode 452A, the determination result information from all the other connecting devices 400A forming the currently selected transmission route among the first to fourth transmission routes, thereby collecting all the determination result information including its own.

Then, the control device 433A can identify, as the poor transmission point, an optical fiber cable 200 connected to the upstream side of the most-upstream-side connecting device 400A among the connecting device(s) 400A the determination result(s) of which indicate(s) the poor transmission state, of all the connecting devices 400A forming the current transmission route.

When identifying the optical fiber cable 200 where the poor transmission is occurring, the control device 433A selects a transmission route not including the identified optical fiber cable 200 from among the first to fourth transmission routes. It is preferable that the control device 433A be configured to, when selecting a transmission route, always select a transmission route having a shorter route length, no matter whether the poor transmission is occurring. Alternatively or additionally, a priority order of the first to fourth transmission routes may be determined in advance.

Depending on the degree of the poor transmission, the feed light 112 and/or the signal light or the like may be completely cut off. If the control device 433A does not obtain, from a connecting device(s) 400A that is included in the current transmission route, the other signal light, which includes the determination result information, when collecting the determination result information from the other connecting devices 400A, the control device 433A regards the connecting device(s) 400A as being in the poor transmission state, thereby being able to identify an optical fiber cable 200 that is the poor transmission point.

Then, the control device 433A outputs the instructions to switch the port connection states (in which two of the three ports are connected) of the optical switches 410 of the connecting devices 400a to 400d (shown in FIG. 5; in this embodiment, the connecting devices 400a to 400d are the same as the connecting devices 400A in configuration) in order to form the selected transmission route.

That is, the control device 433A, through the semiconductor laser 443A and the modulator 442A, makes the other signal light to thereby output the port-connection-state instructions to the outside (other connecting devices 400A, first data communication device 100, second data communication device 300).

For the third process, the control device 433A performs control to switch port connection in each of the optical switches 410, 420 in accordance with the port-connection-state instruction(s) for forming the transmission route that bypasses the poor transmission point, the port-connection-state instruction(s) being generated by itself or received from the other connecting device(s) 400A through the photodiode 452A.

Similarly, in each of the other connecting devices 400A, the control device 433A performs control to switch port connection in each of the optical switches 410, 420 in accordance with the port-connection-state instruction(s) for forming the transmission route that bypasses the poor transmission point. Thus, the transmission route that bypasses the poor transmission point is formed.

In the power over fiber system 1 of the second configuration example having the function to detect the poor transmission of the feed light, all the connecting devices 400A include the control devices 433A, each of which is capable of performing the first to third processes described above. Hence, in the system 1, the control devices 433A of the (plural) connecting devices 400A identify, in parallel, an optical fiber cable 200 where the poor transmission is occurring, select a transmission route that bypasses the poor transmission point, and transmit the port-connection-state instructions for forming the transmission route to the outside.

Since the other signal light, which includes the determination result information, received by each connecting device 400A is identical, the port-connection-state instructions output by each connecting device 400A for forming the transmission route that bypasses the poor transmission point are also identical in content. Hence, the transmission route that bypasses the poor transmission point can be formed properly.

Figure 11:
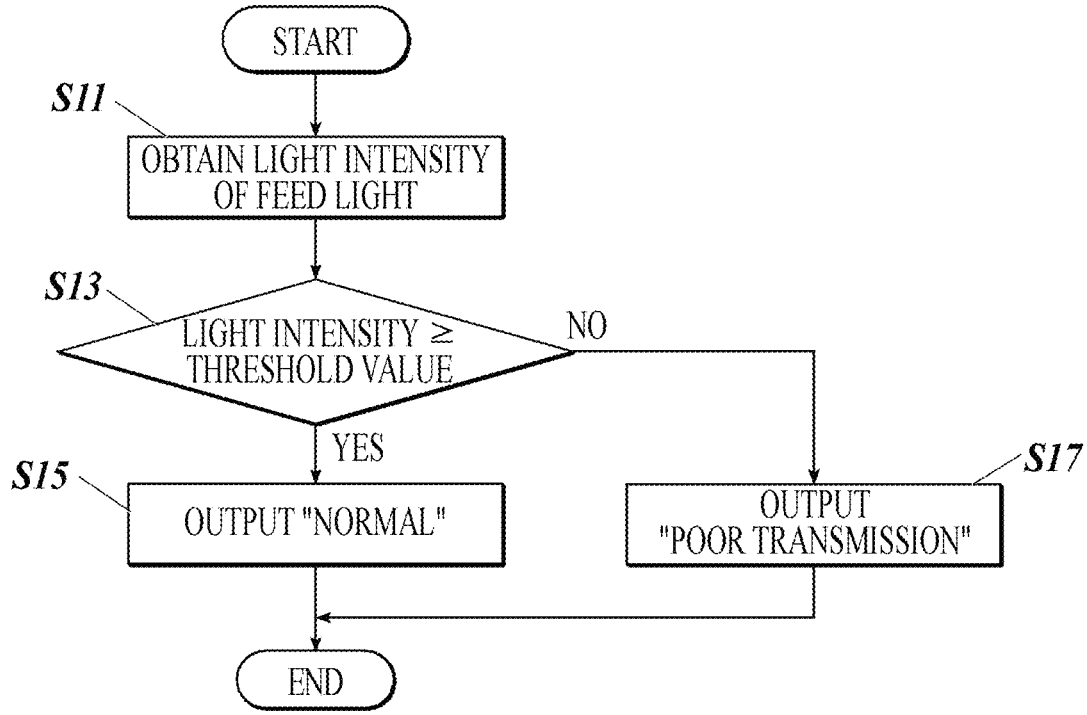
FIG. 11 is a flowchart of a process that is performed by a control device of the connecting device in detecting the poor transmission of the feed light.

FIG. 11 is a flowchart of a process (first process) that is performed by the control device 433A of each connecting device 400A in detecting the poor transmission of the feed light 112. This process is repeated at short intervals at all times.

As shown in FIG. 11, during power supply, the control device 433A obtains the light intensity of a portion of the feed light 112 received by the photoelectric conversion element 432A (Step S11), and compares the detected light intensity with a pre-stored threshold value (Step S13).

If the detected light intensity of the portion of the feed light 112 is equal to or greater than the threshold value, the control device 433A, through the semiconductor laser 443A and the modulator 442A, makes the other signal light by putting therein the source information indicating its connecting device 400A and the determination result information indicating that the transmission of the feed light 112 is normal, and outputs the other signal light to the outside (Step S15).

If the detected light intensity of the portion of the feed light 112 is below the threshold value, the control device 433A, through the semiconductor laser 443A and the modulator 442A, puts, in the other signal light, the source information and the determination result information indicating that the transmission of the feed light 112 is poor, and outputs the other signal light to the outside (Step S17).

Figure 12:
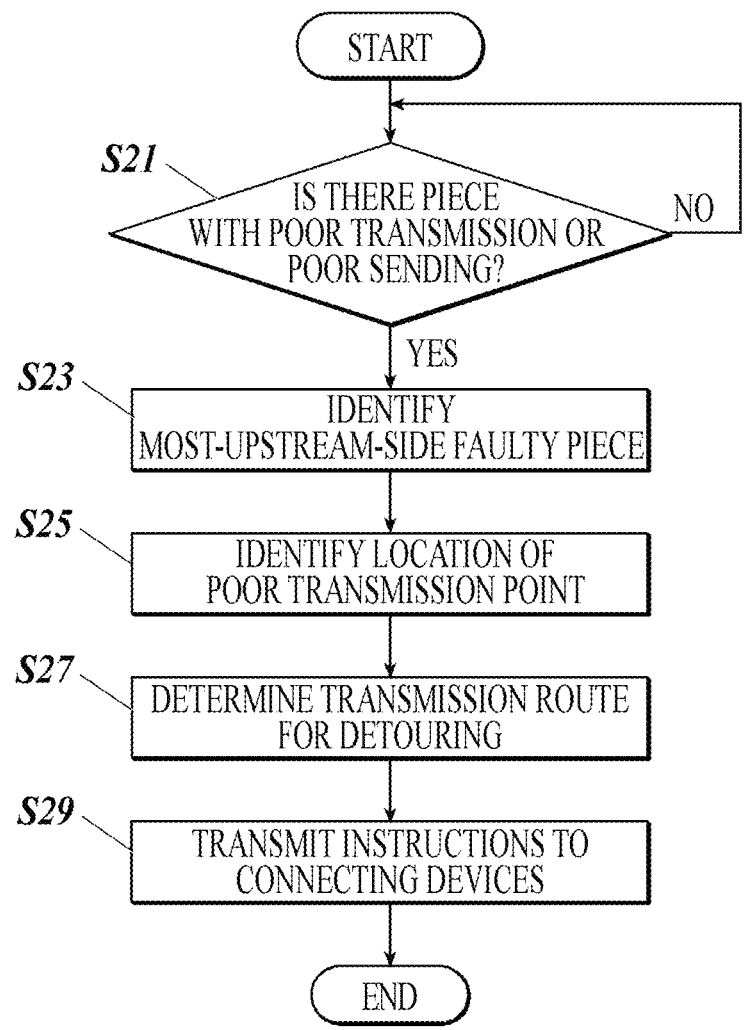
FIG. 12 is a flowchart of a process that is performed by the control device of the connecting device for forming a transmission route that bypasses a poor transmission point at which the poor transmission of the feed light is occurring.

FIG. 12 is a flowchart of a process (second process) that is performed by the control device 433A of each connecting device 400A for forming a transmission route that bypasses the poor transmission point, at which the poor transmission of the feed light 112 is occurring.

The control device 433A of each connecting device 400A obtains, through the photodiode 452A, the source information and the determination result information output from each of the other connecting devices 400A.

Then, the control device 433A refers to the determination result information of all the connecting devices 400A that are included in the current transmission route, and determines whether the poor transmission is occurring (Step S21). At the time, if the control device 433A does not obtain the source information and the determination result information from a connecting device(s) 400A, the control device 433A regards the connecting device(s) 400A as being poor in the transmission.

If no connecting device 400A with the poor transmission is present, the control device 433A repeats Step S21, whereas if a connecting device(s) 400A with the poor transmission is present, the control device 433A identifies, among these, the most-upstream-side connecting device 400A (i.e., one closest to the first data communication device) (Step S23).

Then, the control device 433A identifies, as the poor transmission point, an optical fiber cable 200 connected to the upstream side of the most-upstream-side connecting device 400A (Step S25).

Next, the control device 433A selects, from among the four transmission routes, a transmission route(s) not including the optical fiber cable 200 that is the poor transmission point, and, as needed, determines one transmission route that bypasses the optical fiber cable 200 by taking the transmission distances, priorities and/or the like of the four transmission routes into account (Step S27).

Then, the control device 433A outputs, to the outside through the semiconductor laser 443A and the modulator 442A, the instructions to switch the port connection states of the optical switches 410 of the connecting devices 400a to 400d in order to form the determined transmission route (Step S29).

Each connecting device 400A receives, from the other connecting devices 400A through the photodiode 452A, the instructions to switch the port connection states. Since the control devices 433A of the connecting devices 400A determine the transmission route by using a shared algorithm, they receive the instructions that are identical in content, and hence follow any of the instructions.

For example, the control device 433A of each connecting device 400A may be configured to, when transmitting the other signal light with the determination result information put/contained therein, put information on the determination-made time in the other signal light, and when receiving the instructions to switch the port connection states from the other connecting devices 400A, follow the most recent determination result information among the instructions including its own.

Since the control device 433A of each connecting device 400A receives, from the other connecting devices 400A, the instructions to switch the port connection states, the control device 433A may perform a confirmation process to determine whether these instructions are identical. In this case, if they are identical, the control device 433A may proceed to the next process, whereas if they are not identical, the control device 433A may perform a process of informing each connecting device 400A about the error, assuming that some kind of abnormality is occurring.

Then, the control device 433A extracts, from the instructions to switch the port connection states, an instruction(s) for the optical switches 410, 420 of its connecting device 400A, and controls each of the optical switches 410, 420 to connect ports thereof in accordance with the instruction.

The connecting devices 400a to 400d perform control to switch the port connection states of their optical switches 410 as appropriate to form the transmission route capable of bypassing the poor transmission point.

Thus, in power over fiber system 1 of the second configuration example having the detection function of the poor transmission, each connecting device 400A includes the detector that detects the poor transmission state of the feed light 112 and the output unit that outputs the detection result of the detector to the outside, and the control device 433A identifies the poor transmission point in accordance with the detection results about the poor transmission state of plural connecting devices 400A, and controls the optical switches of the connecting devices 400A so as to form another transmission route of the feed light, the transmission route bypassing the poor transmission point, by outputting the instructions to switch the port connection states.

Hence, even if the poor transmission occurs on a transmission route of the feed light, the feed light 112 can be transmitted, along another transmission route, by bypassing the poor transmission point.

Therefore, even if a situation occurs in which the feed light 112 cannot be transmitted due to the poor transmission point, a quick recovery can be made, and electric power can be supplied with a higher efficiency.

Further, the above-described power over fiber system 1 is configured such that each connecting device 400A detects the poor transmission state from the light intensity of the feed light 112. Thus, the poor transmission can be stably detected with a simple configuration.

Further, the above-described power over fiber system 1 is configured such that each connecting device 400A outputs, to the outside through the optical fiber cables 200, the detection result about the poor transmission, thereby being able to control the optical switches 410 by using the communication function that the power over fiber system 1 has. This makes it possible to avoid complicating the system and construct the system with a few resources.

Further, in the above-described power over fiber system 1, the control device 433A that controls the optical switches 410 of plural connecting devices 400A so as to form another transmission route of the feed light, the transmission route bypassing the poor transmission point, is provided in the connecting device 400A that includes the optical switch 410. Hence, even if the poor transmission occurs and communication becomes difficult, the connecting device 400A can autonomously make the determination and properly operate at least its optical switch 410.

Further, as in the above-described power over fiber system 1, if the above-described control device 433A is provided in every one of the connecting devices 400A, all the connecting devices 400A can autonomously cause their optical switches 410 to perform the switching. Hence, even if a situation occurs in which mutual communication becomes difficult due to the poor transmission, a transmission route for detouring can be formed, a recovery can be made further properly, and reliability of the system can be improved.

[Third Configuration Example Having Detection Function of Poor Transmission]

In the power over fiber system 1 of the second configuration example having the detection function of the poor transmission, the control device 433A of each connecting device 400A performs the first process of outputting, to the outside, the determination result about whether the poor transmission state is occurring, the second process of determining a transmission route that bypasses the poor transmission point and outputting the port-connection-state instructions therefor to the outside, and the third process of performing control to switch port connection in each of the optical switches 410, 420. However, the second process may be performed by the first data communication device 100.

Figure 13:
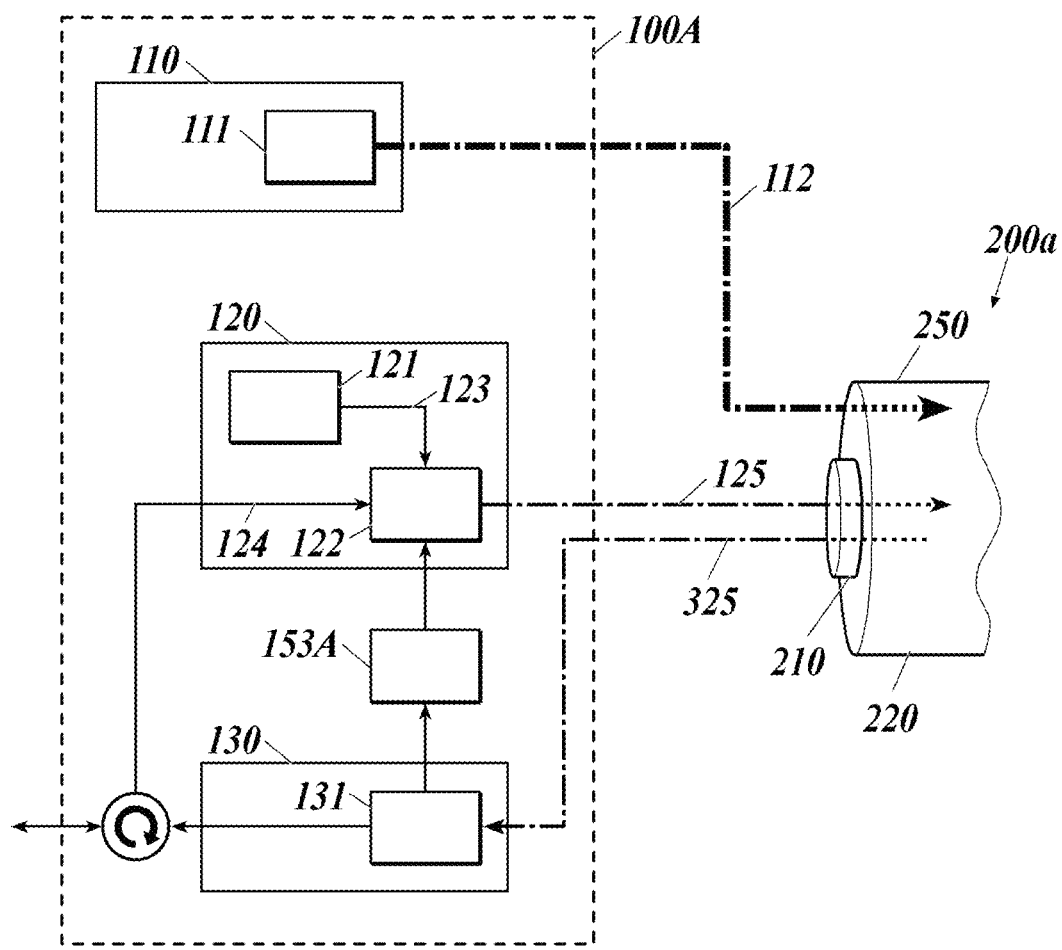
FIG. 13 is a block diagram of a first data communication device in a third configuration example.

Hereinafter, a third configuration example having the detection function of the poor transmission in which a first data communication device 100A includes a control device 153A that performs the second process will be described with reference to a block diagram shown in FIG. 13.

The power over fiber system 1 of the third configuration example is the same as that of the second configuration example having the detection function of the poor transmission, except that the first data communication device 100A includes the control device 153A, and the control device 433A of each connecting device 400A is configured not to perform the second process. Further, the first data communication device 100A is the same as the first data communication device 100 of the second configuration example, except that the first data communication device 100A includes the control device 153A.

The control device 153A of the first data communication device 100A can obtain, from the photodiode 131 of the receiver 130, the source information and the determination result information indicating whether the poor transmission is occurring, which are contained in the other signal light, of each connecting device 400A.

As the second process, the control device 153A collects, through the photodiode 131, the determination result information from all the connecting devices 400A forming the currently selected transmission route among the first to fourth transmission routes.

Then, the control device 153A identifies, as the poor transmission point, an optical fiber cable 200 connected to the upstream side of the most-upstream-side connecting device 400A among the connecting device(s) 400A the determination result(s) of which indicate(s) the poor transmission state, of all the connecting devices 400A forming the current transmission route, and selects a transmission route not including the optical fiber cable 200 where the poor transmission is occurring by taking the shortness of the route lengths and/or priorities of the transmission routes into account.

Then, the control device 153A controls the modulator 122 of the transmitter 120 to output and transmit, to the connecting devices 400A, the instructions to switch the port connection states of the optical switches 410 of the connecting devices 400a to 400d in order to form the selected transmission route, as the other communication light. Hence, it can be said that the control device 153A indirectly controls the optical switches 410 of the connecting devices 400a to 400d forming the selected transmission route by transmitting thereto the instructions to switch the port connection states of the optical switches 410.

The control device 153A may be configured by a microcomputer or a sequencer using an analog circuit or a digital circuit.

Thus, the first data communication device 100A includes the control device 153A that performs the second process. This eliminates the need for each connecting device 400A to perform the second process, and hence can simplify the system configuration.

Further, as described above, not the connecting devices 400A but the first data communication device 100A outputs the instructions to switch the port connection states. This can reduce congestion in communication and maintain excellent communication.

[Fourth Configuration Example Having Detection Function of Poor Transmission]

The second process that is performed by the control devices 433A of the power over fiber system 1 of the second configuration example having the detection function of the poor transmission may be performed by the data processing unit 340 that the second data communication device 300 has as a control device.

The power over fiber system 1 of this example is the same as that of the second configuration example having the detection function of the poor transmission, except that the control device 433A of each connecting device 400A is configured not to perform the second process.

Further, the second data communication device 300 is the same as that shown in FIG. 2 in configuration, except that the data processing unit 340 performs the second process.

The data processing unit 340 of the second data communication device 300 obtains, from the photodiode 331 of the receiver 330, the source information and the determination result information indicating whether the poor transmission is occurring, which are contained in the other signal light, of each connecting device 400A, identifies an optical fiber cable 200 that is in the poor transmission state, and selects a transmission route that bypasses the optical fiber cable 200.

Then, the data processing unit 340 controls the modulator 322 of the transmitter 320 to output and transmit, to the connecting devices 400A, the instructions to switch the port connection states of the optical switches 410 of the connecting devices 400a to 400d in order to form the selected transmission route, as the other communication light. Hence, it can be said that the data processing unit 340 indirectly controls the optical switches 410 of the connecting devices 400a to 400d forming the selected transmission route by transmitting thereto the instructions to switch the port connection states of the optical switches 410.

Thus, the data processing unit 340 of the second data communication device 300 is configured to perform the second process. This can simplify the system configuration, reduce congestion in communication and maintain excellent communication.

[Others]

Although some embodiments of the present disclosure have been described above, these embodiments are made for purposes of illustration and example only. The present invention can be carried out in various other forms, and each component may be omitted, replaced or modified/changed within a range not departing from the scope of the present invention.

For example, in the first to fourth configuration examples having the detection function of the poor transmission, the configuration having the detection function of the poor transmission is applied to the power over fiber system 1, but the configuration is also applicable to the power over fiber system 1B in the same manner.

Further, in the second configuration example having the detection function of the poor transmission, the control devices 433A of all the connecting device 400A perform the second process. However, the control device(s) 433A of one or more of the connecting devices 400A may be configured to perform the second process.

In this case, it is preferable that the control device 433A of the connecting device 400a or 400c, which is included in all the first to fourth transmission routes of the feed light 112, be configured to perform the second process. It is further preferable that the control device 433A of the connecting device 400a, which is located upstream as compared with the connecting device 400c, be configured to perform the second process.

Further, in the first to fourth configuration examples having the detection function of the poor transmission, the configuration having the detection function of the poor transmission is applied to the power over fiber system 1 in which power is supplied from one first data communication device 100 to one second data communication device 300, but not limited thereto.

For example, the configuration may be applied to a power over fiber system in which power is supplied from one first data communication device 100 to a plurality of second data communication devices 300. In this case, a branched transmission route of the feed light 112 is provided from the first data communication device 100 to the second data communication devices 300. Hence, even if the poor transmission point is present on the transmission route of the feed light 112 to one second data communication device 300, the feed light 112 can take the transmission route of the feed light 112 to another second data communication devices 300 for detouring. This eliminates the need to prepare a transmission route(s) specialized for detouring, and hence can simplify the configuration and save resources.

INDUSTRIAL APPLICABILITY

An optical power supply system according to the present invention has industrial applicability to an optical power supply system that performs stable power supply.

The invention claimed is:

1. A power over fiber system, comprising:
a power sourcing equipment including a semiconductor laser that oscillates with electric power, thereby outputting feed light;
a powered device including a photoelectric conversion element that converts the feed light into electric power;
a plurality of optical fiber cables that transmit the feed light; and
a plurality of optical switches that selectively connect the plurality of optical fiber cables,
wherein the plurality of optical fiber cables and the plurality of optical switches can form at least two transmission routes of the feed light,
wherein the power over fiber system further comprises a plurality of connecting devices each including:
  a detector that detects a poor transmission point on a transmission route among the at least two transmission routes of the feed light, wherein the poor transmission point is a transmission point in a poor transmission state in which a light intensity of the feed light is below a threshold value,
  an optical switch of the plurality of optical switches, and
  an output unit that outputs a detection result of the detector to outside of said each connecting device, and wherein the power over fiber system further comprises a control device that
  identifies the poor transmission point in accordance with the detection result of the detector of each of the plurality of connecting devices, and
  controls the plurality of optical switches so as to form another transmission route among the at least two transmission routes of the feed light in accordance with the identified poor transmission point, the another transmission route bypassing the poor transmission point.

2. The power over fiber system according to claim 1, wherein the detector detects reflected light of the feed light, the reflected light being from the poor transmission point on the transmission route of the feed light, and
wherein the control device obtains, from the reflected light detected by the detector, a distance to the poor transmission point, and controls the plurality of optical switches so as to form the another transmission route of the feed light.

3. The power over fiber system according to claim 1, wherein the control device controls the plurality of optical switches through the plurality of optical fiber cables.

4. The power over fiber system according to claim 1, wherein the control device controls the plurality of optical switches so as to preferentially form, as the another transmission route of the feed light, a transmission route having a shorter transmission distance among the at least two transmission routes.

5. The power over fiber system according to claim 1, wherein the output unit of each of the plurality of connecting devices outputs the detection result of the detector to the control device through an optical fiber cable among the plurality of optical fiber cables.

6. The power over fiber system according to claim 1, wherein the power sourcing equipment is provided with the control device.

7. The power over fiber system according to claim 1, wherein the powered device is provided with the control device.

8. The power over fiber system according to claim 1, wherein the control device is provided in one or more of the plurality of connecting devices.

9. The power over fiber system according to claim 8, wherein the control device is provided in every one of the plurality of connecting devices.

10. The power over fiber system according to claim 1, wherein a semiconductor material of a semiconductor region of the semiconductor laser, the semiconductor region exhibiting a light-electricity conversion effect, is a laser medium having a laser wavelength of 500 nm or less.

11. The power over fiber system according to claim 1, wherein a semiconductor material of a semiconductor region of the photoelectric conversion element, the semiconductor region exhibiting a light-electricity conversion effect, is a laser medium having a laser wavelength of 500 nm or less.

* * * * *